US008577337B2

(12) United States Patent
O'Leary

(10) Patent No.: US 8,577,337 B2
(45) Date of Patent: Nov. 5, 2013

(54) RADIO MANAGEMENT METHOD AND SYSTEM USING EMBEDDED UNIVERSAL INTEGRATED CIRCUIT CARD

(75) Inventor: Edward A. O'Leary, Ajax (CA)

(73) Assignee: Rogers Communications Inc., Toronto, Ontario (CA)

( * ) Notice: Subject to any disclaimer, the term of this patent is extended or adjusted under 35 U.S.C. 154(b) by 88 days.

(21) Appl. No.: 13/411,700

(22) Filed: Mar. 5, 2012

(65) Prior Publication Data
US 2013/0231087 A1   Sep. 5, 2013

(51) Int. Cl.
*H04M 1/66* (2006.01)
(52) U.S. Cl.
USPC ..... 455/411; 455/410; 455/432.3; 455/432.1; 455/450; 455/414.1
(58) Field of Classification Search
USPC ......... 455/410, 411, 450, 432.1, 432.3, 414.1
See application file for complete search history.

(56) References Cited

U.S. PATENT DOCUMENTS

| | | | | |
|---|---|---|---|---|
| 2007/0259691 | A1* | 11/2007 | Santos Garcia | 455/558 |
| 2009/0089865 | A1* | 4/2009 | Baron et al. | 726/6 |
| 2010/0029243 | A1* | 2/2010 | Ozer et al. | 455/404.1 |
| 2012/0016989 | A1 | 1/2012 | Fuller | |
| 2012/0020325 | A1 | 1/2012 | Swamy et al. | |
| 2012/0077505 | A1* | 3/2012 | Wietfeldt et al. | 455/450 |
| 2012/0289197 | A1* | 11/2012 | Holtmanns et al. | 455/411 |
| 2013/0157673 | A1* | 6/2013 | Brusilovsky | 455/450 |

OTHER PUBLICATIONS

Jean-Louis Carrara, et al., Telecommunications, The Role of the UICC in Long Term Evolution, all IP networks, Gemalto, Jan. 2009.
Oberthur Technologies, White Paper, UICC in LTE, May 7, 2011.
Luis Barriga, et al.,Enabling M2M Device Connectivity, M2M Remote-Subscription Management, Ericsson Review, Jan. 2011.
David Maxwell, Embedded SIM—An Overview, GSMA, updated.
SIMalliance GSMA meeting Oct. 6, 2011, Agenda, Activation Rules and Remarks.

* cited by examiner

*Primary Examiner* — Khalid Shaheed
(74) *Attorney, Agent, or Firm* — Rowand LLP

(57) ABSTRACT

A multi-use embedded universal integrated circuit card contains more than one active MNO (mobile network operator) profile. The example card may include a time manager and a radio resource schedule for managing access to a radio within a wireless device. The time manager enables one of the active MNO profiles at a time in accordance with the radio resource schedule, effectively allocating respective time slices to applications associated with each of the active MNO profiles.

20 Claims, 5 Drawing Sheets

RADIO MANAGEMENT METHOD AND SYSTEM USING EMBEDDED UNIVERSAL INTEGRATED CIRCUIT CARD

COPYRIGHT NOTICE

A portion of the disclosure of this document and accompanying materials contains material to which a claim for copyright is made. The copyright owner has no objection to the facsimile reproduction by anyone of the patent document or the patent disclosure, as it appears in the Patent and Trademark Office files or records, but reserves all other copyright rights whatsoever.

FIELD

The present application generally relates to radio communications, in particular, to managing access to a radio in a wireless device using an embedded universal integrated circuit card.

BACKGROUND

Mobile phones and other devices that operate on public land mobile networks (PLMNs) currently contain a Subscriber Identity Module (SIM) card that specifies the mobile network operator (MNO) to which the device user is subscribed. In this manner, the device is granted appropriate access to the available network resources and billing is allocated correctly. Users are able to change their subscription to a different MNO by inserting a new SIM card, subject to possible SIM-locks implemented within the phones or networks to prevent subscription changes that undermine device-cost-subsidy plans. A SIM is technically an application that resides within what is properly termed a universal integrated circuit card (UICC).

Development is underway on an embedded UICC (EUICC), which would be an integrated circuit component soldered directly to a circuit board within a wireless device. This creates an issue because it is not possible to change the EUICC if the device owner wishes to change to a new active MNO. Accordingly, it is expected that a third-party subscription manager will be provided with the authority and capability to manage and authorize the provisioning of MNO profiles to EUICCs and the switching of which MNO profile on a EUICC is the active profile, subject to various policies and restrictions. EUICCs are expected to be used primarily in machine-to-machine (M2M) wireless devices, although they may become prevalent in other wireless devices.

The architecture of the EUICC and its operation may present barriers to their efficient and effective use in some circumstances.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
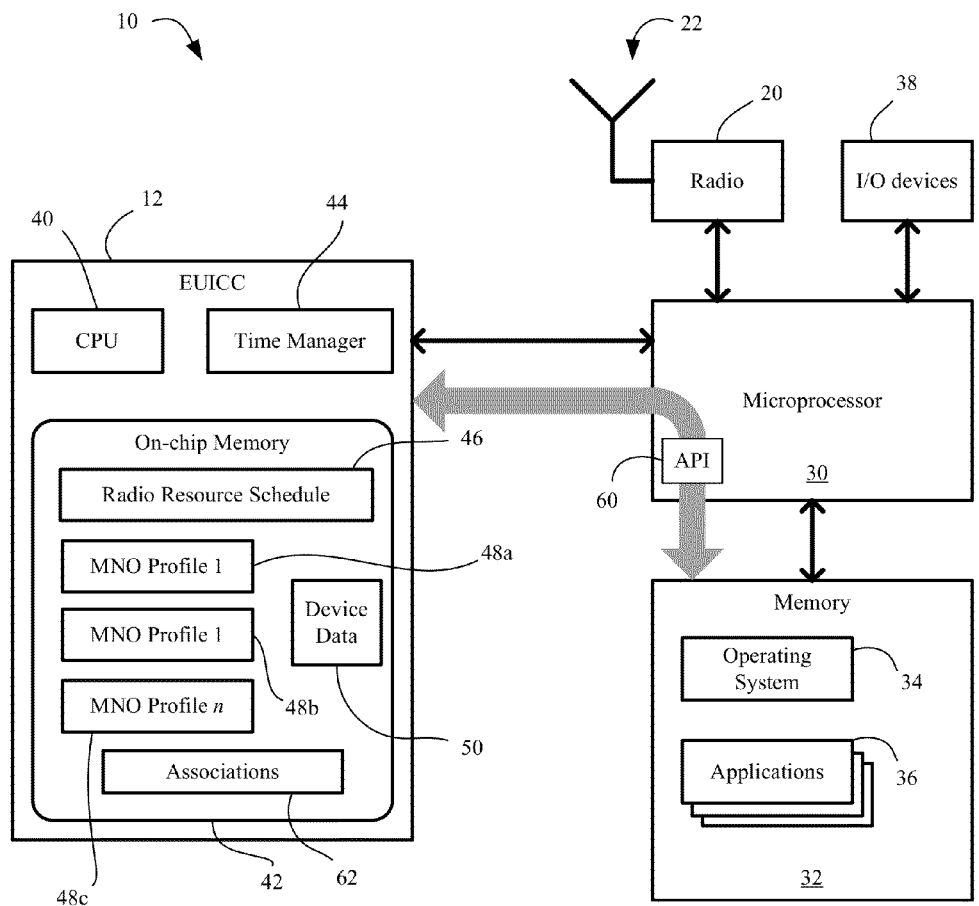
FIG. 1 shows an example wireless device with an embedded universal integrated circuit card, in block diagram form.

In some of the example embodiments, the present application describes a multi-active-MNO embedded universal integrated circuit card. The example card may include a time manager and a radio resource schedule for managing access to a radio within a wireless device. The time manager enables one of the active MNO profiles at a time in accordance with the radio resource schedule, effectively allocating respective time slices to applications associated with each of the active MNO profiles.

In one aspect, the present application describes a system that includes a radio; an embedded universal integrated circuit card having a memory storing at least a first MNO profile and a second MNO profile, and storing a radio resource schedule, and a time manager configured to selectively enable one of the first MNO profile and the second MNO profile based upon the radio resource schedule; a first application associated with the first MNO profile; and a second application associated with the second MNO profile. When the first MNO profile is enabled the first application is able to access the radio and the second application is not able to access the radio, and when the second MNO profile is enabled the second application is able to access the radio and the first application is not able to access the radio.

In one aspect, the present application describes a method of managing access to a radio in a wireless device, the wireless device having an embedded universal integrated circuit card storing a plurality of active MNO profiles, and storing a radio resource schedule, the wireless device having at least one respective application associated with each of the plurality of active MNO profiles. The method including selectively enabling one of the plurality of active MNO profiles based on the radio resource schedule and a current time, whereby a first application associated with the enabled profile is granted access to the radio; determining whether a time allocation for the enabled profile has expired; and disabling the enabled profile when the time allocation has expired and enabling another of the plurality of active MNO profiles based on the radio resource schedule and the current time, whereby a second application associated with the enabled another profile is granted access to the radio.

In yet a further aspect, the present application describes non-transitory computer-readable media storing computer-executable program instructions which, when executed, configured a processor to perform the described methods.

In yet another aspect, the present application may more broadly be applied to management of fixed-line communications using an embedded universal integrated circuit card in a non-wireless communications device, such as a set-top box for example. Some fixed-line devices may incorporate an embedded universal integrated circuit card in some instances to provide the device with one or more IMSIs and to enable the fixed-line devices to receive and send communications that are normally associated with mobile communications, such as SMS messages. The described methods and systems may be applied in allocating access to the fixed-line communications subsystem for routing communications to a fixed-line communication subscription provider or operator, such an ISP, carrier, or other third-party entity. Accordingly, in this aspect, the present application is not necessarily limited to wireless devices and/or radio access management.

In another aspect, the present application describes a communications device. The device includes a communication subsystem; an embedded universal integrated circuit card having a memory storing at least a first operator profile and a second operator profile, and storing a communication resource schedule, and a time manager configured to selectively enable one of the first operator profile and the second operator profile based upon the communication resource schedule; a first application associated with the first operator profile; and a second application associated with the second operator profile. When first operator profile is enabled the first application is able to access the communication subsystem and the second application is not able to access the communication subsystem. When the second operator profile is enabled the second application is able to access the communication subsystem and the first application is not able to access the communication subsystem. In one example, the communication subsystem includes a fixed-line IP interface. For example, the communication subsystem may include an Ethernet interface, a WiFi interface, or other IP-based communications interface.

Other aspects and features of the present application will be understood by those of ordinary skill in the art from a review of the following description of examples in conjunction with the accompanying figures.

Mobile devices typically contain a removable Universal Integrated Circuit Card (UICC), which is often referred to as a SIM (Services Identity Module) card. The UICC is a smart card that features a CPU, ROM, RAM, and input/output contacts. The UICC runs one or more SIM applications (different applications may be resident on the UICC for connecting to different types of networks—i.e. GSM, CDMA, UMTS, etc.). The SIM application securely stores the International Mobile Subscriber Identity (IMSI) and related keys to enable access and authentication on a wireless network. The SIM application may also securely store information regarding the local network, information regarding services that the subscriber is able to access, and passwords or PINs. In some cases, the UICC may also store messaging data, such as contact information.

A user of a mobile device obtains the UICC from a particular mobile network operator (MNO). The MNO loads its profile on the UICC prior to distribution so that the mobile device wirelessly connects to the MNO's public land mobile network (PLMN). The user of the mobile device may change the MNO the devices uses by changing the UICC. In some cases, however, an MNO may "lock" a mobile device to prevent carrier changes; particularly, where the MNO has provided the device to a user free or at a substantial discount in exchange for the user's commitment to a long-term service contract. This is typically referred to as a "SIM-lock".

Removable smart-card-based UICCs are expected to be replaced by embedded UICCs (EUICCs), which are soldered directly onto the circuit board within a mobile device. Expectations are that EUICCs may be particularly common in non-conventional wireless devices engaged in Machine-to-Machine (M2M) communications such as, for example, smart meters, automobiles, m-health cards or devices, various monitoring or tracking devices, etc. The EUICC may end up being the de facto technology used in most, if not all, wireless devices, including smart phones, mobile phones, tablets, and other user-centric devices. As noted above, the EUICC may also be embedded in non-wireless devices to enable those devices to engage in communications normally considered "mobile" communications.

Embedding the EUICC presents a challenge to conventional UICC technology in that the EUICC cannot simply be removed and replaced in order to change the MNO that the device uses to access wireless services. Accordingly, EUICCs may permit the storage of multiple MNO profiles, only one of which will be active at a given time. In order to prevent user switching of MNOs, various policies and restrictions may be put in place to govern which MNO profile is made active for the device. A remote third-party administration service, termed a Subscription Manager (SM), may be tasked with enabling the activation of a particular profile on a EUICC, and enforcing various policies surrounding activations.

Many M2M devices or applications may end up requiring low bandwidth. In some cases, the radio usage will be in small infrequent bursts. For example, with new paging classes, some M2M devices may only engage in small bursts of data communication once or twice a month. Most of the M2M devices may be configured to use HSDPA or LTE networks, which offer vast access to bandwidth.

Some M2M devices may have multiple uses or interested stakeholders, with each stakeholder having an interest in obtaining data or otherwise communicating with a device. For example, in the case of automobiles, applications may include sending performance and diagnostic data to the OEM, On-Star™-type services, emergency wireless services (car crash detection and audio connection to a PSAP), IP-based radio, GPS and other navigation functions, electronic tolling, IP-based entertainment services, and micro-insurance applications, to name a few. One option is for each service having different providers/stakeholders to have a separate radio in the automobile for wireless communications. This may be costly and may introduce potential interference issues.

Accordingly, in one aspect the present application describes a multi-use EUICC. The multi-use EUICC is configured to store multiple active MNO profiles. In some implementations, the multi-use EUICC may have a securely partitioned memory space, with a part allocated to each application or 'use' for the EUICC. For example, in the case of an m-health device, one part may be allocated for use by a Ministry of Health application, another part may be allocated for use by a physician to collect diagnostic information, and yet another part may be allocated for use by an insurer for obtaining treatment and billing data. Yet other applications may be defined and separate parts or containers created within the EUICC. Each part may have one or more MNO profiles (one of which is active for each part). The active MNO in that part is the MNO used by the associated application(s). This permits different applications or functions to use different MNOs. Accordingly, the Ministry of Health may contract with one MNO to obtain data from m-health devices, each physician or physician's office may contract with another MNO to obtain diagnostic data, and each insurer may contract with its own preferred MNO to obtain data. In some cases, they may all use the same MNO, but have different subscriptions.

The example embodiments described below relate to wireless devices and regulation of access to the radio within a wireless device. As mentioned above, the EUICC may find application in non-wireless devices for extending mobile-type services to fixed-line devices. This may be the case in connection with IP-based communications devices. Example devices may include IPTV set-top boxes (STBs), home phones, alarm monitoring devices, personal computers, cable Docsis/GPON modems, and televisions, to name a few. In any of these devices, there may be multiple organizations or entities that would like communications access to the device using different subscription models, including in some cases virtual operators or over-the-top (OTT) service providers.

Reference is now made to FIG. 1, which shows, in block diagram form, an example of a wireless device 10 with a multi-use EUICC 12. The wireless device 10 includes a radio 20 and at least one RF antenna 22. The radio 20 includes components for detecting and demodulating RF signals received from the antenna and for generating and modulating RF signals to transmit via the antenna 22. The radio 20 may further be configured to implement one or more mobile communications protocols, such as, but not limited to, HSPA+, UMTS, LTE, WiMAX, etc. The radio 20 may manage the messaging and signaling for obtaining and maintaining a radio link to a wireless base station, such as a cellular tower, and for performing handoffs while roaming. The details of radio communication in a cellular network are well understood by those ordinarily skilled in the art and, as such, will not be further detailed here.

The example wireless device 10 includes a microprocessor 30 that controls device operation and executes applications. The wireless device 10 also includes memory 32, which may include non-volatile memory like flash memory and volatile memory like random access memory (e.g. SRAM, DRAM, etc.). The memory 32 may store an operating system 34 that, when executed by the microprocessor 30, controls basic device functions and provides a platform within which applications may be executed. The memory 32 may also include applications 36. Some of the applications 36 may require radio access to send and receive data with a remote location or to establish a session or connection to a remote device, and each may be associated with an MNO, as will be described below.

The operating system 34 may be configured to regulate access to the radio 20. For example, in one implementation an application 36 may generate an interrupt or other request message to the operating system 34 when the application 36 wishes to use the radio 20. The operating system 34, in conjunction with the EUICC 12, may be configured to handle that interrupt or request message in accordance with one or more of the methods described herein for regulating access to the radio 20. In one example implementation, an API 60, which term is intended to include any suitable interrupt/request-handling routine, determines (partly in concert with the EUICC 12) whether to grant or refuse the request for radio access, as will be described further below.

The wireless device 10 may include one or more I/O devices 38, such as a display screen, speaker, microphone, various sensors, keyboard, keypad, touchscreen, LED, buttons, etc. In some M2M devices, very few or no I/O devices 38 may be present.

The EUICC 12 is embedded in the wireless device 10 and it communicates with the microprocessor 30 via a data connection, typically at the circuit board level. The EUICC 12 includes a CPU 40 and on-chip memory 42. The EUICC 12 also includes a time manager 44. The time manager 44 is an application or module or routine configured to regulate access to the radio 20. The time manager 44 may be implemented as a software module or application executed by the CPU 40. In some examples, the time manager 44 is implemented entirely within the EUICC 12. In some cases, the time manager 44 or some of its functions (as will be described below) are implemented by the operating system 34, API 60, or another routine or process executed by the microprocessor 30. The API 60 may be configured based on information and/or commands provided by the time manager 44, such that the API 60 is configured to deal with radio access requests from applications 36. In some cases, the API 60 may be configured to relay a request for radio access to the time manager 44 for a decision on whether to permit access.

The on-chip memory 42 stores a radio resource schedule 46 and a plurality of MNO profiles 48 (shown individually as 48a, 48b, 48c). Each MNO profile 48 is associated with one or more of the applications 36. The on-chip memory 42 may also store device data 50, in some embodiments. The device data 50 may include contact information, SMS messages, and other such data. The on-chip memory 42 may also store associations 62 between MNO profiles 48 and the one or more applications 36 associated with that MNO profile 48. In some implementations, the associations 62 may be explicitly or implicitly within the radio resource schedule 46.

In operation, the time manager 44 enables one of the active MNO profiles 48 at a time in accordance with the radio resource schedule 46. The radio resource schedule 46 allocates time to the various applications 36 on the basis of their priority and need for access to radio communication. In other words, in some implementations the radio resource schedule 46 assigns time slices to a particular application(s) or, equivalently, to the respective associated MNO profile 48. The radio resource schedule 46 may be implemented in any one of a number of ways. In one example embodiment, the radio resource schedule 46 assigned particular times to respective particular MNO profiles 48. Such an embodiment may, for example, be implemented as a table or other data structure of access times or logic rules for determining the MNO profile 48 to enable based on the current time. In some cases, the radio resource schedule 46 may include a set of priority rankings to assist in determining the MNO profile 48 to enable at the current time. In yet another example, the priority rankings may be broken down into communication types for a particular application 36, wherein certain types of communications are considered more urgent and higher priority than others. In yet a further example, the rankings or priority scores may be dynamic, such that the priority assigned to an application 36 or associated MNO profile 48 gradually increases the longer that the application 36 or associated MNO profile 48 waits for access to the radio 20. Yet other variations will be described below and will be appreciated in light of the description herein.

Note that only one of the active MNO profiles 48 may be enabled at one time. The time manager 44 is configured to "enable" one active MNO profile 48 and to "disable" or block the other active MNO profiles 48 in accordance with the radio resource schedule 46. The "enabling" and "disabling" of profiles may be implemented in a number of ways. In a first example embodiment, more than one of the active MNO profiles 48 may be registered with its respective network. That is, the wireless device 10 may be registered at attached to two different MNO networks (or conceivably, as two different IMSIs on the same MNO network using two different subscriptions), but only one of the registered MNO profiles 48 is given access to the radio 20 at a time. This may be most easily implemented in cases where one or more of the MNO profiles 48 has a paging class with infrequent access needs, such that the paging class frequency negotiated with the network is incorporated into the radio resource schedule 46 and conflicting access requirements are avoided.

In a second example embodiment, more than one of the MNO profiles 48 is registered with its respective network, but all but one of the MNO profiles 48 appear to the network as "dropped" or "out-of-coverage". On switching to one of the "dropped" MNO profiles, the radio 20 engages in the prescribed reattachment to that network specified by the applicable wireless communications standard.

In a third example embodiment, MNO profiles 48 that are "disabled" by the EUICC 12 are de-registered from their respective networks, such that switching MNO profiles 48 involves de-registering the current MNO profile 48 and going through the registration process for the new MNO profile 48 with its respective MNO network.

In the above examples, the time manager 44, in concert with the API 60, implement the "disabling" of an MNO profile 48 by blocking its associated applications 36 from accessing the radio 20. This may be implemented through denying requests for access to the radio 20 from the application 36 in some cases.

In one example, the wireless device 10 may have a default or user-authorized MNO profile 48. This MNO profile 48 may be profile for the MNO that the user has contracted with for services and from whom the user may have purchased the wireless device 10. This profile may be considered the "default" profile and the radio resource schedule 46 may allocate all time to this default MNO profile 48 except for particular slices that are allocated to other profiles 48. For example, one of the applications 36 on the mobile device 36 may involve relaying data to an insurer or other third-party that cannot, or will not, impose the cost of their data airtime usage on the user. This third-party application 36 may have an associated MNO profile 48 in the EUICC 12. In an example, the third-party application 36 may have bandwidth requirements that are met by about 30 seconds of radio access once a day. The radio resource schedule 46 may allocate this time to the third-party application 36 at a preset time, such as at 3 a.m. daily. At that time, the time manager 44 may disable the default MNO profile 48 and may enable the third-party associated MNO profile 48, thereby permitting the use of the third-party associated MNO profile 48 for radio communications. The time manager 44 may be configured to notify the microprocessor 30, operating system 34, API 60, and/or applications 36 of the change in radio access. For example, the time manager 44 (through API 60 in some cases) may notify the third-party application 36 once the associated MNO profile 48 is enabled that the third-party application 36 may begin using radio resources. In some instance, this notification may be in reply to a pending access request generated by the application 36 in the past. In some cases, the time manager 44, API 60, or other components of the wireless device 10 may notify other applications 36 that they are not permitted to access the radio resources. In some cases, those notifications may be in reply to pending requests for access generated by those other applications 36. In some examples, an application 36 may have its radio access disable while it is actively using the radio resources, in which case the application 36 implements whatever dropped-radio-link handling routine it has for dealing with a loss of radio connectivity.

As noted above, the radio resource schedule 46 may also incorporate priority settings. For example, the third party application 36 may have a low priority setting since it is relaying non-real-time information. In the event that another application 36 is engaged in real-time use of the radio resources of the device 10 at the time the third-party application 36 is entitled to use the radio 20, the time manager 44 and radio resource schedule 46 may be configured to delay switching until the real-time application usage has ended. Priority rankings may be set during the provisioning process when an application is installed and in the course of modifying the radio resource schedule 46 as a result of the provisioning of the new application 36. Priority rankings may also change dynamically to elevate low rankings for an application 36 that has been denied radio access for a significant period of time. Priority rankings may also be broken down into types of communications. For example, an application 36 may have a low-priority routine reporting function that can be delayed without significant impact, and may have an emergency communication function that is given a very high priority. As an example, a health monitoring device may have a routine daily diagnostic reporting function that is of low communications priority, and may have an alarm reporting function that is triggered by a detected health emergency, such as a cardiac condition, that has an urgent priority.

The microprocessor 30 may also assist in the time allocation function of the time manager 44. For example, when the time manager 44 allocates radio time to a non-default MNO profile 48 associated with a particular third-party application, the microprocessor 30 and/or operating system 34, in many cases through API 60, may be configured to prevent other applications 36 from hijacking the radio resources and thereby using the data subscription associated with the third-party MNO profile 48.

Figure 2:
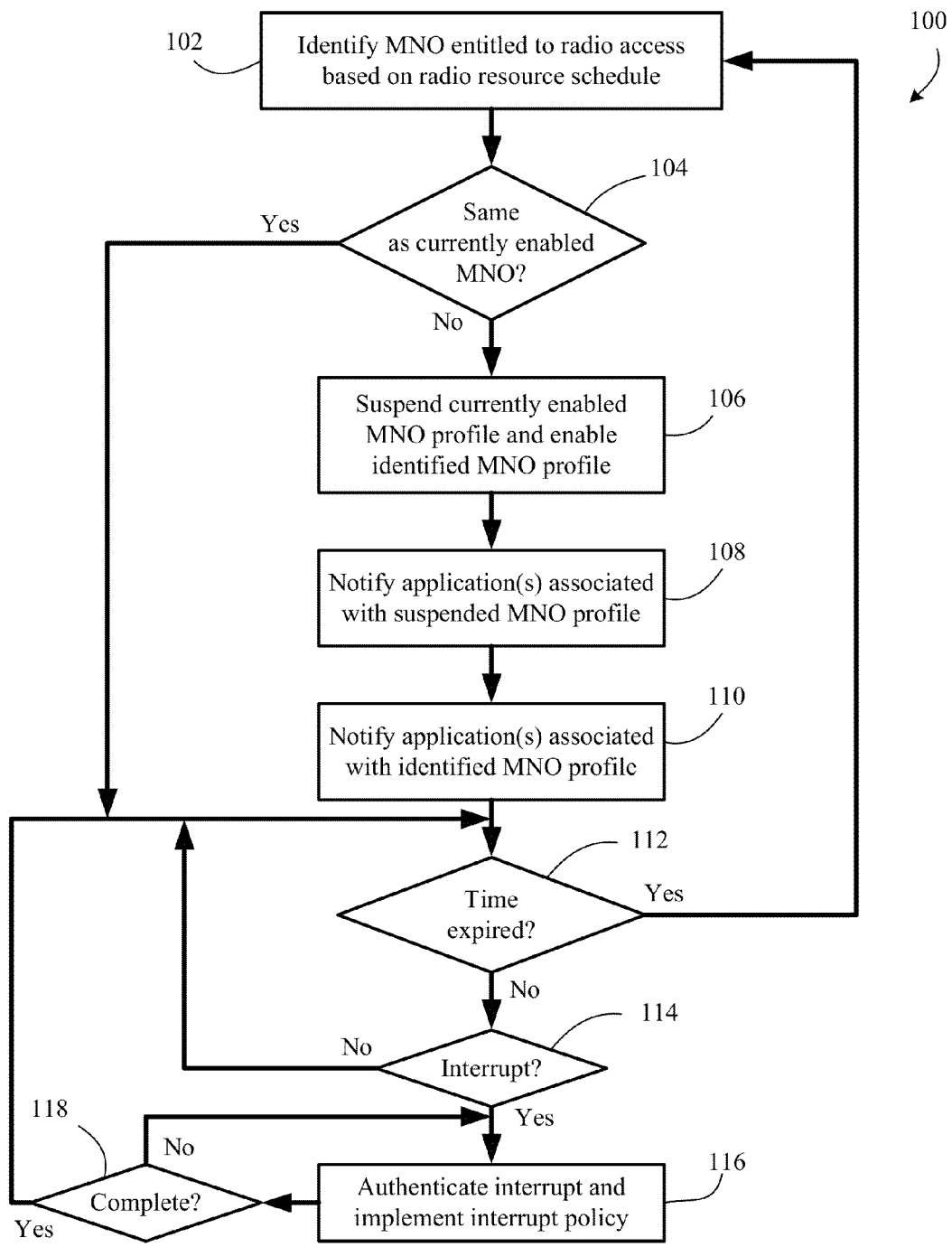
FIG. 2 shows, in flowchart format, one example method of managing access to a radio resource.

Reference is now made to FIG. 2, which shows, in flow-chart form, a method 100 for managing radio access in a wireless device. The wireless device may be any wireless communication device, including simple machine-to-machine devices, mobile devices, smart phones, tablets, laptops, smart cards, etc. In some cases, the wireless device includes a device embedded in another machine, such an automobile. The wireless device includes an RF radio and an associated antenna and circuitry. It also includes a EUICC, such as the example EUICC 12 described above in connection with FIG. 1.

The method 100 includes operation 102, in which the time manager identifies which active MNO (or, MNO profile) is entitled to radio access based upon the current time and the radio resource schedule. The current time may be tracked by the CPU within the EUICC or may be supplied to the EUICC as a clock signal from the wireless device. The time may be a network time obtained by the wireless device from the wireless network.

In operation 104, the time manager determines whether the identified MNO is the same as the current MNO; the current MNO being the MNO that is currently enabled and has access to the radio. If the identified MNO is not the same as the current MNO, then in operation 106 the current MNO profile is suspended/disabled by the time manager. As noted previously, enabling and disabling may include registering and deregistering with respective networks in some cases. In some other cases, the networks may be left unaware of the change in enabled/disabled MNO profile. The identified MNO is also enabled and granted access to the radio. In other words, the time manager switches the enabled active MNO profile from the current MNO to the identified MNO so that any radio-related communication rely upon the new profile when establishing a radio link and attempting communications. This may include configuring or otherwise updating the API to permit radio access requests from applications associated with the newly-enabled MNO profile, and to deny radio access requests from other applications. In some embodiments, the API may be configured to pass those requests on to the time manager for decision/response, in which case enabling and disabling includes handling those requests as they arrive in accordance with the radio resource schedule to allow requests from applications associated with the newly-enabled MNO profile and denying requests from applications associated with the now-disabled MNO profiles.

In this example process, in operation 108, the time manager or other component of the EUICC notifies the application(s) associated with the current (now or soon-to-be disabled) MNO profile that access to the radio has been suspended. Accordingly, these associated applications will know not to attempt radio communications. In some cases, an application actively engaged in radio communications will lose its access to the radio, in which case it will experience a loss of radio connectivity and will handle it accordingly.

In this example process, in operation 110, the time manager or other component of the EUICC notifies the application(s) associated with the identified (now or soon-to-be enabled) MNO profile that access to the radio has been granted. Thus, these associated applications will know that they can now engage in whatever data communications they are required to perform.

It will be appreciated that in some embodiments operations 108 and/or 110 may be implemented by notifying the microprocessor 30 (FIG. 1) or operating system 34 (FIG. 1) or API 60 (FIG. 1), which may then notify individual applications. In some cases, the EUICC may maintain a list of associated applications for each MNO profile that enables the EUICC to notify the correct associated applications. In the case where one profile is the default MNO profile, then it may not have a list of associated applications, whereas other MNO profiles may have associated applications. In such a case, the applications not associated with one of the other MNO profiles may be blocked from accessing the radio when one of the other MNO profiles is enabled. In yet other cases, operations 108 and 110 are implemented only in reply to requests for access received from the respective applications. That is, the EUICC does not necessarily proactively notify the associated applications that their respective MNO profile has been enabled or disabled, but rather it notifies any application that requests radio access whether it is available.

In operation 112, the time manager evaluates whether the time allocated to the newly-identified MNO profile has expired, based on the radio resource schedule and the current time. If so, then the method 100 returns to operation 102 to identify the next MNO profile in the schedule. Otherwise, it continues at operation 114 where, in this example, the EUICC evaluates whether it has received an interrupt or other request for radio access.

In one example, the API is configured to reject requests for access to the radio by applications on the basis that the EUICC informs the API of the currently-enabled MNO profile and/or its associated applications. If the requesting application is not an associated application, then its request for access is refused by the API. Nonetheless, the API may be configured to alert the EUICC to requests for access that meet "emergency" criteria. Certain types or classes of request may be designated as emergency requests, which the API is configured to send to the EUICC. In this case, operation 116 involves determining or confirming that the request is an emergency (perhaps at the API level), and passing to the EUICC. In some cases, the EUICC may authenticate the veracity of the emergency request before authorizing the API to approve the request for access. The EUICC may switch the currently-enabled MNO profile in response to the emergency request in some embodiments. In some cases, policies may require that the EUICC allow the emergency communication to occur irrespective of whether the application is associated with the currently enabled MNO profile. In some cases, the policy may provide that the EUICC attempt to secure connectivity on an associated MNO network with the associated MNO profile and, if unsuccessful, to use any other MNO profile with which the device may obtain connectivity in order to ensure the emergency communication succeeds. For example, in the case of an emergency E911 call initiated by the device user the device may be configured to use whatever the currently-enabled MNO profile is, irrespective of whether it is the user's subscription or a third-party's subscription. In another example, in the case of a car crash or similar emergency the mobile device may be configured to use the current MNO profile (or abruptly switch to another MNO profile irrespective of the radio resource schedule) to initiate a car crash report and audio connection to a local PSAP. Operation 116 reflects the authentication and implementation of interrupt policy. The authentication operation may be an authentication process designed to validate an interrupt signal to prevent a malicious third-party application from high-jacking an MNO subscription for radio communication by pretending to be related to an interrupt/emergency situation.

In another example, the API passes or relays all requests for access to the radio on to the EUICC for a decision. In this example, operation 116 involves determining whether the received request is an emergency request or not. If not, then the time manager determines whether to grant the request on the basis of the current time and the radio resource schedule. If the request is an emergency request, then the time manager or other component of the EUICC authenticates the request using whatever procedure has been put in place for authentications of that nature and allows access, subject to policies regarding whether the current MNO profile may be used or another MNO profile tried first, as described above.

Once the interrupt handling is complete, as indicated in operation 118, the method 100 returns to operation 112 to again evaluate if the time allocated has expired.

It will be appreciated that the foregoing description of an example process for managing access to radio resources includes a "hard coded" access regime based upon time slices specified in the radio resource schedule, plus an interrupt or request-based emergency override process. In another example, the process may be wholly "hard-coded" and based on the radio resource schedule. In yet other examples, the process could be entirely request-based with dynamic radio resource allocation decisions based on logic rules and/or policies/priorities. Paging classes and schedules may be reflected in the radio resource schedule, the logic rules and/or the priorities to ensure that the appropriate MNO profile is enabled at the correct time to receive pre-scheduled paging messages.

Figure 5:
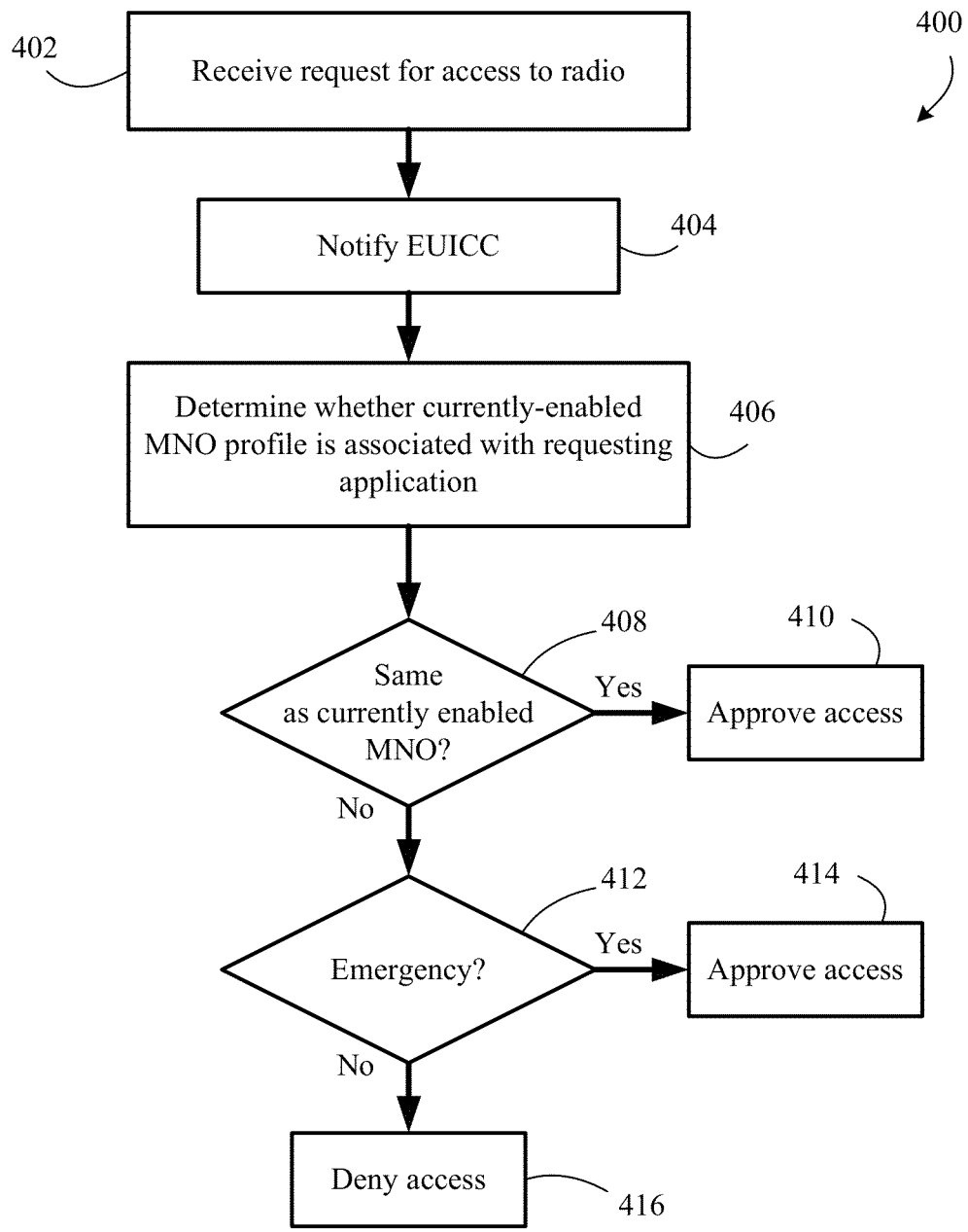
FIG. 5 shows, in flowchart format, an example process for handling a request for access to radio resources.

Reference is now made to FIG. 5, which shows, in flowchart form, an example process 400 illustrating request-based handling of radio resource management. The process 400 includes an operation 402 of receiving a request for access to the radio from one of the applications on the wireless device. The request may be received, in this example, by an API or other operating system call initiated by the application. In operation 404 that request is relayed, passed, or otherwise communicated to the EUICC. In some implementations, the API may be configured to notify the EUICC of the pending request for access. The notice to the EUICC indicates the requesting application and may include additional parameters, such as a communication type (i.e. emergency or non-emergency), priority indication, anticipated duration or bandwidth requirement, etc.

In operation 406, the EUICC determines whether the currently-enabled MNO profile is associated with the requesting application. The association may be stored within the radio resource schedule, within a stored association in the EUICC memory, or elsewhere. If, in operation 408, it is found to be associated with the current MNO profile, then in operation 410 the request for access is approved (subject to any other conflict-avoidance processes governing competing requests for access to the radio by applications that are otherwise entitled to access the radio). If the requesting application is not associated with the currently-enabled MNO profile, then in operation 412, the EUICC determines whether the request is an emergency request. This may include authenticating the request against some set of pre-established criteria for determining whether a request is a legitimate emergency.

If it is an emergency, then in operation 414 the EUICC may instruct the API or operating system to permit radio access in reply to the request. In some cases, this may also involve switching the enabled MNO profile, if necessary. In some cases, access may be granted irrespective of the currently-enabled MNO profile. Other policies may also be brought to bear upon the mechanism for facilitating access to the radio to ensure the emergency communication occurs successfully.

If the request is not an emergency, then the EUICC may instruct the API or operating system to deny radio access in reply to the request, as indicated by operation 416.

Figure 3:
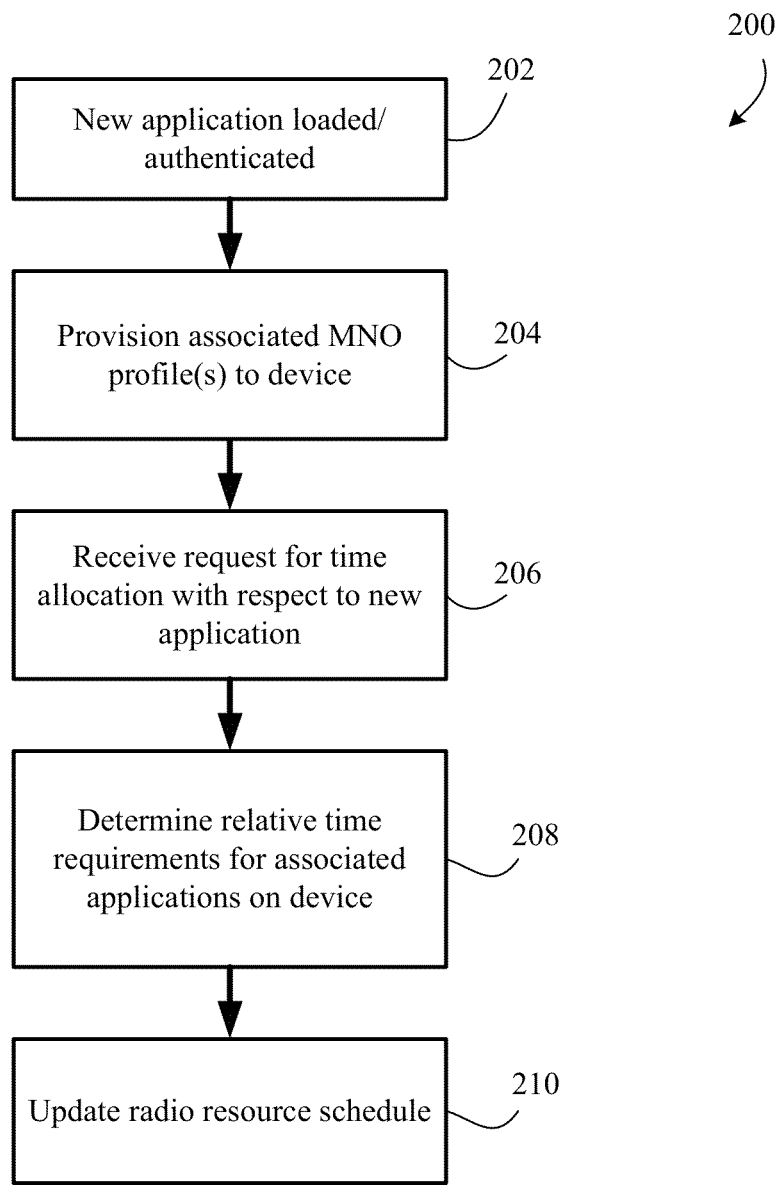
FIG. 3 shows, in flowchart format, one example method of generating a radio resource schedule for managing access to a radio in a wireless device.

Reference will now be made to FIG. 3, which shows, in flowchart form, an example method 200 for allocating radio resources in a wireless device. In this example method 200 a new application is loaded or installed on the wireless device in operation 202. In some cases, the new application may be authenticated through an authentication process.

The new application may be associated with a different MNO profile, other than the default or currently installed MNO profile(s). In operation 204, the different MNO profile is provisioned to the EUICC. In one case, if the different MNO profile is not already present in the EUICC, then the provisioning process includes requesting the different MNO profile from a third-party subscription management service for EUICCs. The third-party service generates the required information and obtains any necessary authorizations or performs any necessary confirmations to ensure that the different MNO profile is intended to be used in association with the new application. The third-party subscription manager then provides the EUICC with the different MNO profile credentials and any other information necessary to establish and activate the different MNO profile in the EUICC in association with the new application.

In some cases, the different MNO profile may already be present in the EUICC and the provisioning operation of operation 204 involves authorizing the activation of the different MNO profile for use in association with the new application. The activation request may be send to the third-party subscription service, which may then perform any necessary authentications or checks to ensure that the different MNO profile may be activated in association with the new application. If authenticated/confirmed, then the third-party subscription services sends the EUICC any required credentials or other information to activate the different MNO profile.

In operation 206, a request for time allocation is received by the entity or component managing the radio resource schedule. The request may be generated by the associated application, the time manager, or another component of the device, or by the subscription manager or associated MNO. In some instances, the entity receiving the request for time allocation may be the time manager. In other instances, this entity may be a network component configured to calculate time allocations. In yet other instances, this function is shared between the time manager and a network component. The network component may be referred to below as a network-based allocator.

In operation 208, the relative time requirements for the new application and all other applications or functions on the device are determined so as to allocate time slices to the various applications. In operation 210, the radio resource schedule is updated based on the determination made in operation 208, and the updated radio resource schedule is stored in the EUICC. The time requirements for the new application may be specified or characterized by the MNO associated with the application. In some instances, the subscription manager may have those requirements or characteristics. The requirements may be based upon paging class, in some cases. Different types of communications for a single application may have different requirements that collectively define the time requirements of the application.

Operation 208 may be implemented using a number of possible algorithms for determining time allocations. In one example, the operating system of the device and its default set of applications are given all time available, subject to time slices that are assigned to applications having a different associated MNO profile.

In one example embodiment, the applications (or their associated MNO or the subscription manager) indicate the data bandwidth and frequency of communication needed for proper functioning of the application. These parameters are used by the time manager and/or network-based allocator to determine the time slices allocated to each of the applications.

In another example embodiment, each application has an associated priority ranking. In some cases, functions within the application may have an associated priority ranking; for example, a one-per-day data upload from an application to a central server may have high priority whereas a periodic GPS-based location reporting function may have a low priority since it is considered a less critical function of the application. The time manager and or network-based allocator use the priority rankings to assist in resolving conflicts and scheduling in determining the time allocation.

A number of logic rules may be implemented within the time manager and/or network-based allocator to determine optimal or suitable time allocations for a specific example implementation. Paging classes and negotiated paging times may be factored into the radio resource schedule.

The time allocations are reflected in the updated schedule that is stored in operation 210. As described above, in some implementations, notifications may be sent by the EUICC/time manager to applications to notify them of their time allocations.

Figure 4:
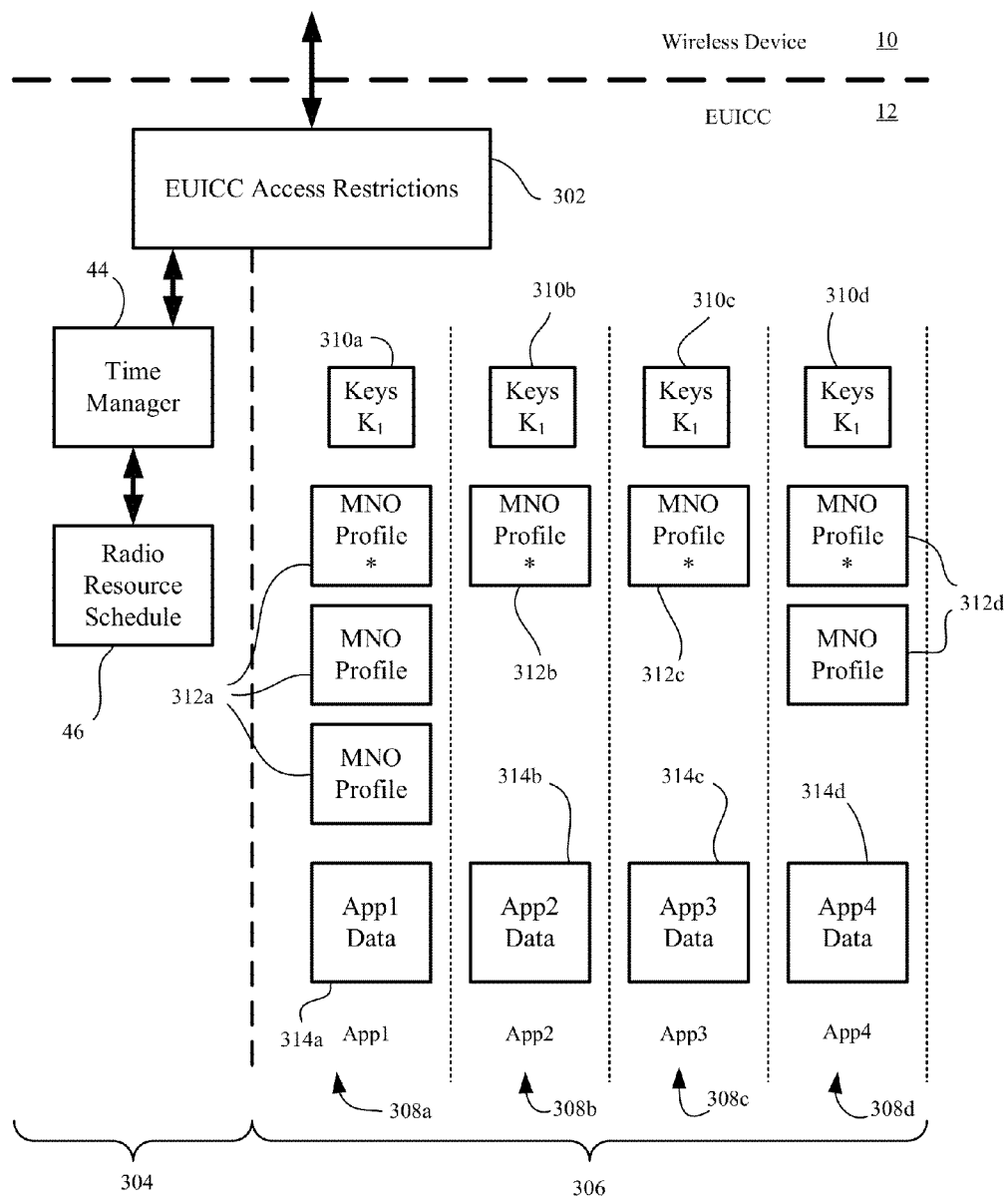
FIG. 4 diagrammatically illustrates an example embedded universal integrated circuit card.

Reference will now be made to FIG. 4, which diagrammatically illustrates an example EUICC 12. The example EUICC 12 is configured to communicate with an example wireless device 10, subject to EUICC access restrictions 302. The EUICC access restrictions 302 generally restrict access to the memory and contents of the EUICC 12 to prevent tampering and unauthorized access. The EUICC access restrictions 302 may generally refer to tokens, credentials, and enciphering. For example, master credentials may be present in the EUICC for installing or managing other credentials. Tokens may be present to give authorizations to process actions within the EUICC. EUICC transport credentials may be present for validating communications from a third-party subscription manager, or others.

In this example the time manager 44 and radio resource schedule 46 operate from a common portion 304 of the memory. The common portion 304 of the memory is that portion of memory that is not specific to a particular application or service. Note that the "common" portion 304 of the memory may still be a secure area that is difficult for third-parties to access or modify without successfully being authenticated through the EUICC access restrictions 302.

A service-specific portion 306 of the memory includes the MNO profiles 48 and associated information. In this example the service-specific portion 306 is securely partitioned into application-based containers 308 (shown individually as 308*a*, 308*b*, 308*c*, and 308*d*). Access to the containers 308 is managed by the EUICC access restrictions 302. The partitioning may be logical partitioning. It may, in some cases be notional in that the EUICC access restrictions 302 allow access to only one of the containers 308 based on the authentication credentials of the application or API requesting access to the container 308.

Each container 308 is associated with at least one application. For example, a first container 308a may be associated with the device operating system and default applications, whereas the second, third and fourth containers 308b, 308c, 308d, respectively, may each be associated with a respective specific application that uses a third-party subscription (hence, the separate container for using a different MNO subscription).

Each container 308 includes one or more MNO profiles 312 (shown as 312a, 312b, 312c, and 312d). Container 308a, for example, includes three MNO profiles 312a, one of which is "active" as graphically indicated by the asterisk symbol. As noted previously, a third-party subscription service may be used to provision MNO profiles 312 to the EUICC 12 and to activate a particular MNO profile 312, including switching from one MNO profile 312 to another MNO profile 312.

The containers 308 also each store keys 310 (individually shown as 310a, 310b, 310c, and 310d) for establishing secure communications with the wireless network.

Each set of keys 310 are generated/provisioned for the active MNO profile 312 for that container 308. The keys 310 may be used to authenticate the device with the wireless network and generate a session key or other such credential for encrypting subsequent communications with the wireless network.

The containers 308 may, in some cases, also include application data 314 (individually 314a, 314b, 314c, and 314d). Application data 314 may include information specifying the application(s) with which the container 308 and its active MNO profile 312 are associated. Application data 314 may also or alternatively include application-specific data, including user data for that application. Examples include contact information, calendar information, user identification or password information, etc. Other data may also be stored in the containers 308 for use by the associated application(s) in the course of wireless communications over the radio.

It will be appreciated that two different MNO profiles 312 in two different containers 308 may relate to the same MNO, but may involve different subscriptions.

It will also be understood that the EUICC 12/time manager 44 may be configured to override the radio resource schedule 46 in specific exceptional situations. Certain application and/or operations may be given an exceptional priority status that allows them to use the currently active MNO profile for radio communication irrespective of whether the exceptional application has an association with the current MNO subscription. For example, exceptional status may be given to E911 calls or to car crash sensor reports or audio connections to a PSAP. The granting of exceptional priority status may, in some cases, be governed by the third-party subscription manager to prevent abuse.

Certain adaptations and modifications of the described embodiments can be made. Therefore, the above discussed embodiments are considered to be illustrative and not restrictive.

What is claimed is:

1. A system, the system comprising:
   a radio;
   an embedded universal integrated circuit card having
   a memory storing at least a first MNO (Mobile Network Operator) profile and a second MNO profile, and storing a radio resource schedule, and
   a time manager configured to selectively enable one of the first MNO profile and the second MNO profile based upon the radio resource schedule; a first application associated with the first MNO profile; and a second application associated with the second MNO profile,
   wherein the memory has a portion securely partitioned into containers, and wherein a first container stores the first MNO profile and associated data, and wherein a second container stores the second MNO profile and associated data, and
   whereby when the first MNO profile is enabled the first application is able to access the radio and the second application is not able to access the radio, and whereby when the second MNO profile is enabled the second application is able to access the radio and the first application is not able to access the radio.

2. The system claimed in claim 1, wherein the radio resource schedule specifies time allocations for the first application and the second application, and wherein the time manager is configured to selectively enable said one of the MNO profiles based upon the time allocations and a current time.

3. The system claimed in claim 1, wherein the radio resource schedule specifies a time at which the first application is entitled to access the radio and a time at which the second application is entitled to access the radio, and wherein the time manager selectively enables said one of the MNO profiles based upon the radio resource schedule and a current time.

4. The system claimed in claim 1, wherein the radio resource schedule includes dynamic priority rankings for the first application and the second application and wherein the time manager selectively enables said one of the MNO profiles based upon the dynamic priority rankings.

5. The system claimed in claim 1, wherein selectively enabling an MNO profile comprises approving a request for radio access received from the enabled MNO profile and denying a request for radio access received from a disabled MNO profile.

6. The system claimed in claim 1, wherein the first MNO profile and the second MNO profile are both active profiles authorized by a third-party subscription manager, and wherein the time manager is configured to ensure only one of the MNO profiles is enabled at a time.

7. The system claimed in claim 1, wherein the embedded universal integrated circuit card includes EUICC access restrictions that prevent unauthenticated access to the containers.

8. The system claimed in claim 1, wherein the first container further stores one or more inactive MNO profiles.

9. The system claimed in claim 1, wherein the system comprises a wireless device.

10. The system claimed in claim 9, wherein the wireless device comprises a mobile device.

11. A method of managing access to a radio in a wireless device, the wireless device having an embedded universal integrated circuit card storing a plurality of active MNO (Mobile Network Operator) profiles, and storing a radio resource schedule, the wireless device having at least one respective application associated with each of the plurality of active MNO profiles, the method comprising:
   storing each of the plurality of active MNO profiles in a respective securely partitioned part of memory within the embedded universal integrated circuit card;
   selectively enabling one of the plurality of active MNO profiles based on the radio resource schedule and a current time, whereby a first application associated with the enabled profile is granted access to the radio; the current time, whereby a second application associated with the enabled another profile is granted access determining whether a time allocation for the enabled profile has expired; and disabling the enabled profile when the time allocation has expired and enabling another of the plurality of active MNO profiles based on the radio resource schedule and to the radio.

12. The method claimed in claim 11, wherein the radio resource schedule specifies time allocations for the first application and the second application, and wherein selectively enabling comprises selectively enabling said one of the plurality of active MNO profiles based upon the time allocations and the current time.

13. The method claimed in claim 11, wherein the radio resource schedule specifies a time at which the first application is entitled to access the radio and a time at which the second application is entitled to access the radio.

14. The method claimed in claim 11, wherein selectively enabling comprises approving a request for radio access received from an enabled MNO profile and wherein disabling the enabled profile comprises denying a request for radio access received from the disabled profile.

15. The method claimed in claim 11, wherein the first MNO profile and the second MNO profile are both active profiles authorized by a third-party subscription manager, and wherein the time manager is configured to ensure only one of the MNO profiles is enabled at a time.

16. The method claimed in claim 11, further comprising provisioning one of said plurality of active MNO profiles to the embedded universal integrated circuit card by a third-party subscription manager.

17. The method claimed in claim 11, further comprising storing at least one inactive MNO profile in one of the respective securely-partitioned parts.

18. A non-transitory processor-readable medium storing processor-executable instructions which, when executed, configures one or more processors to perform the method claimed in claim 11.

19. A communications device, the device comprising:
a communication subsystem;
an embedded universal integrated circuit card having
a memory storing at least a first operator profile and a second operator profile, and storing a communication resource schedule, and
a time manager configured to selectively enable one of the first operator profile and the second operator profile based upon the communication resource schedule;
a first application associated with the first operator profile; and
a second application associated with the second operator profile,
wherein the memory has a portion securely partitioned into containers, and wherein a first container stores the first operator profile and associated data, and wherein a second container stores the second operator profile and associated data, and
whereby when the first operator profile is enabled the first application is able to access the communication subsystem and the second application is not able to access the communication subsystem, and whereby when the second operator profile is enabled the second application is able to access the communication subsystem and the first application is not able to access the communication subsystem.

20. The communication device claimed in claim 19, wherein the communication subsystem comprises a fixed-line IP interface.

* * * * *